C. M. RICHARDSON.
FLYING MACHINE.
APPLICATION FILED JULY 30, 1915.
1,184,571.
Patented May 23, 1916.
5 SHEETS—SHEET 1.
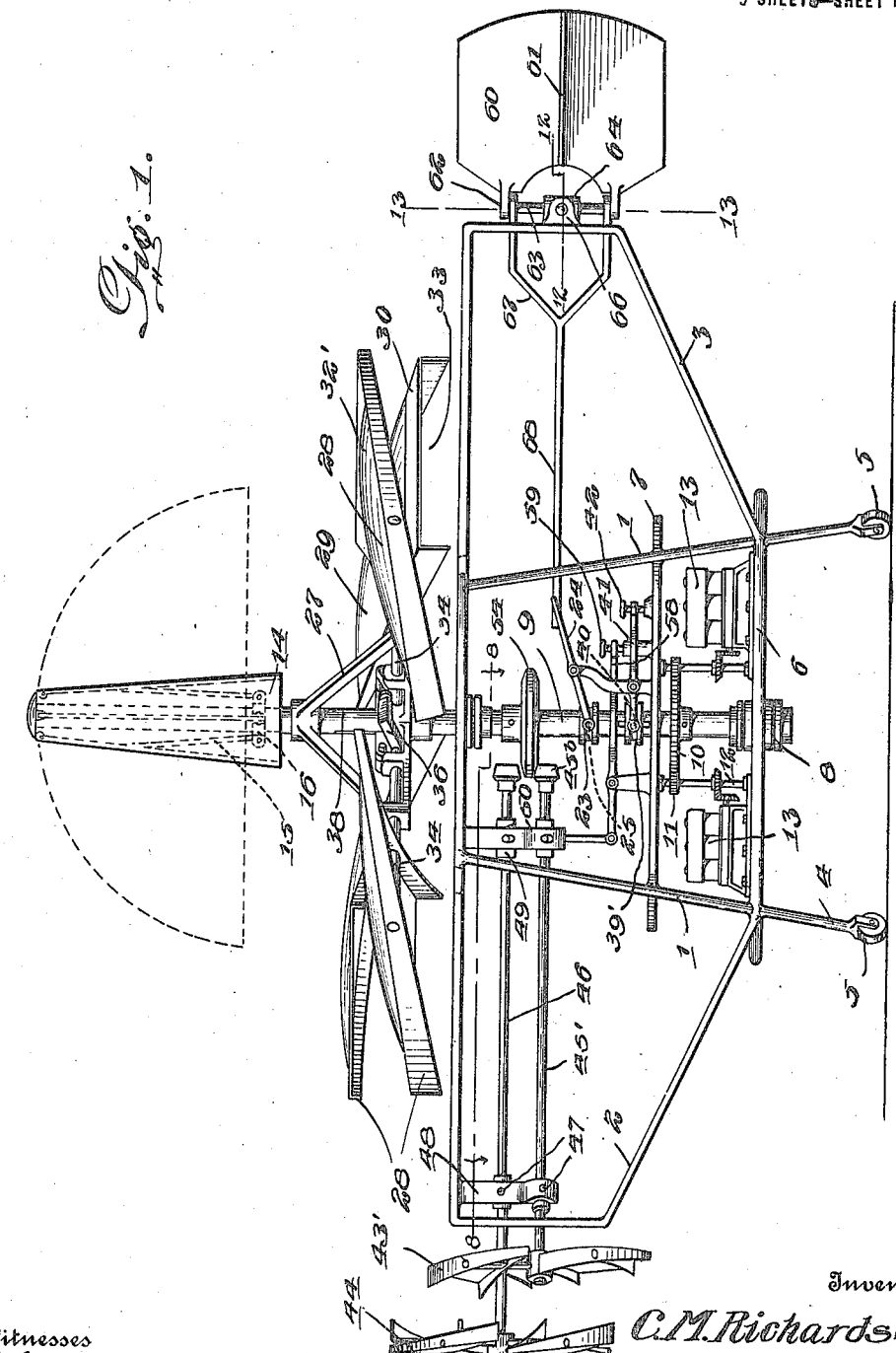
Witnesses
Frederick L. Fox.
Inventor
C. M. Richardson.
By Victor J. Evans.
Attorney

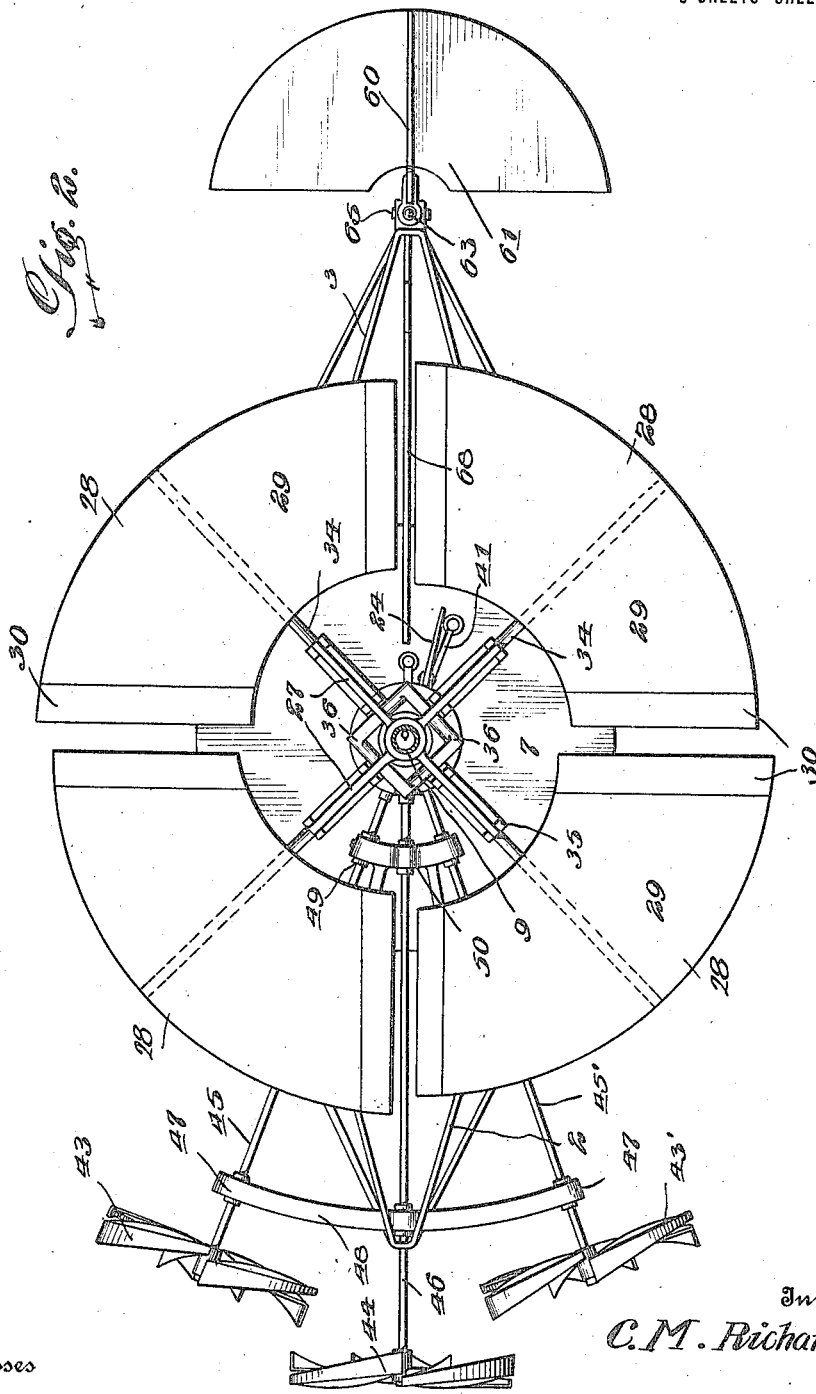

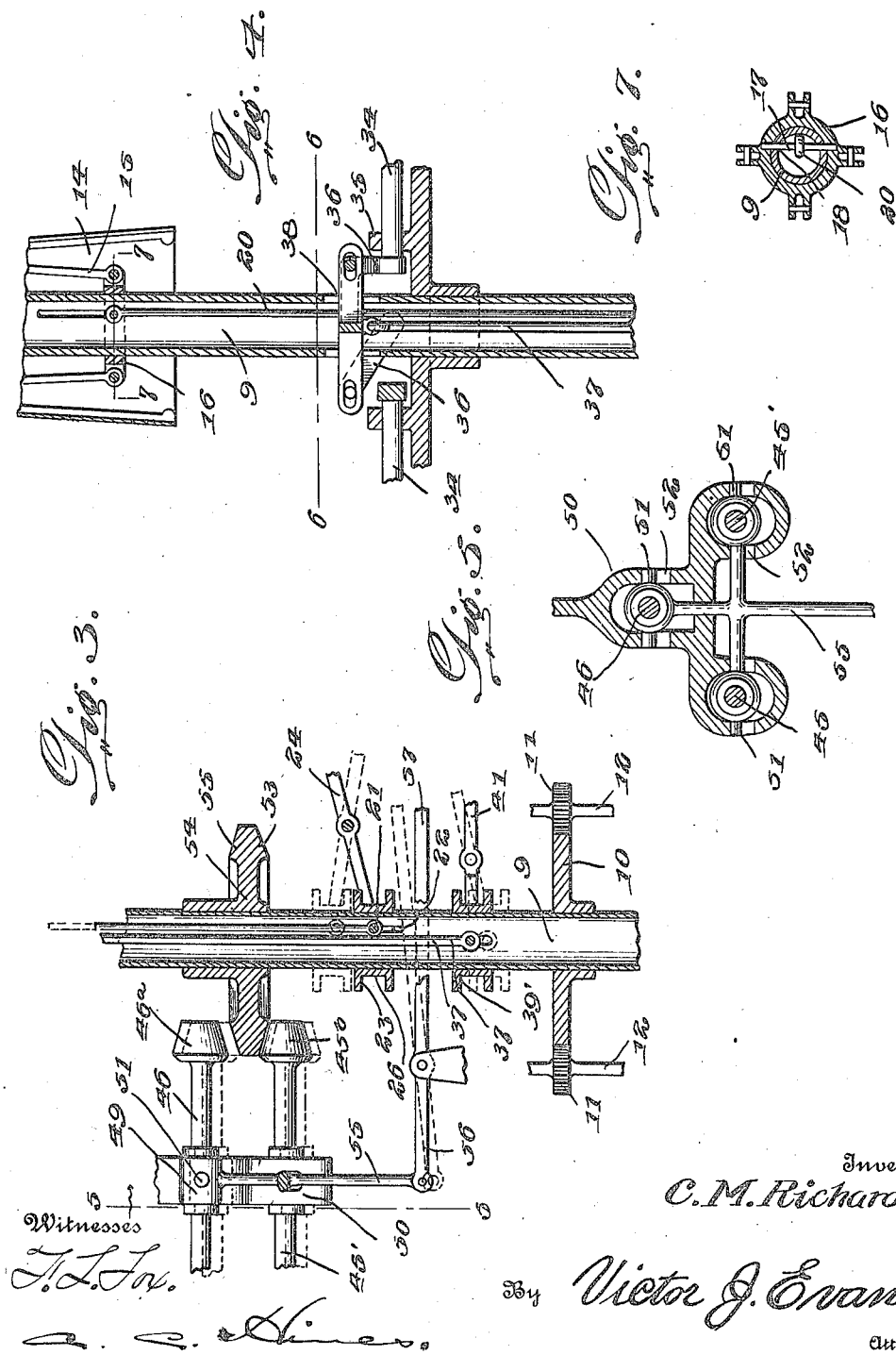

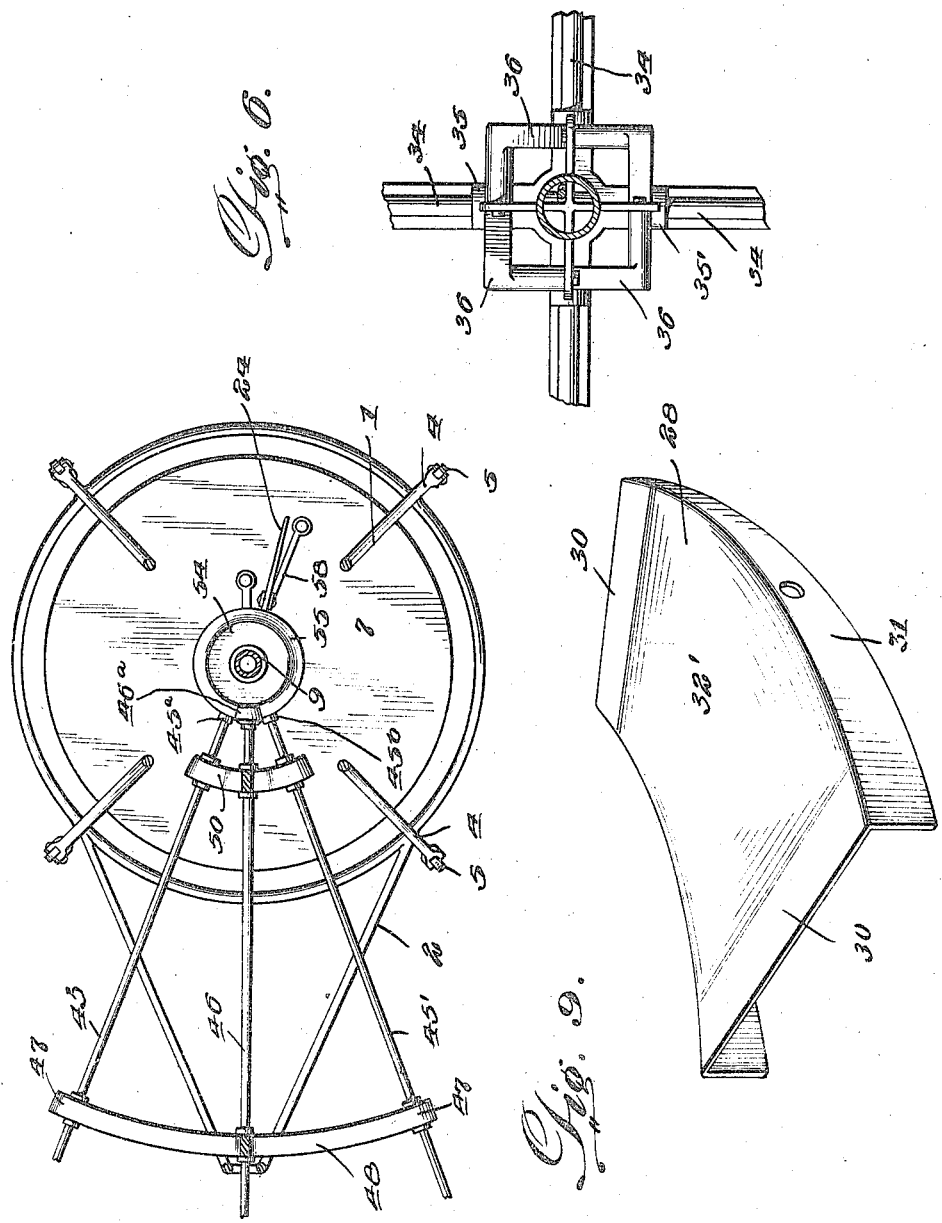

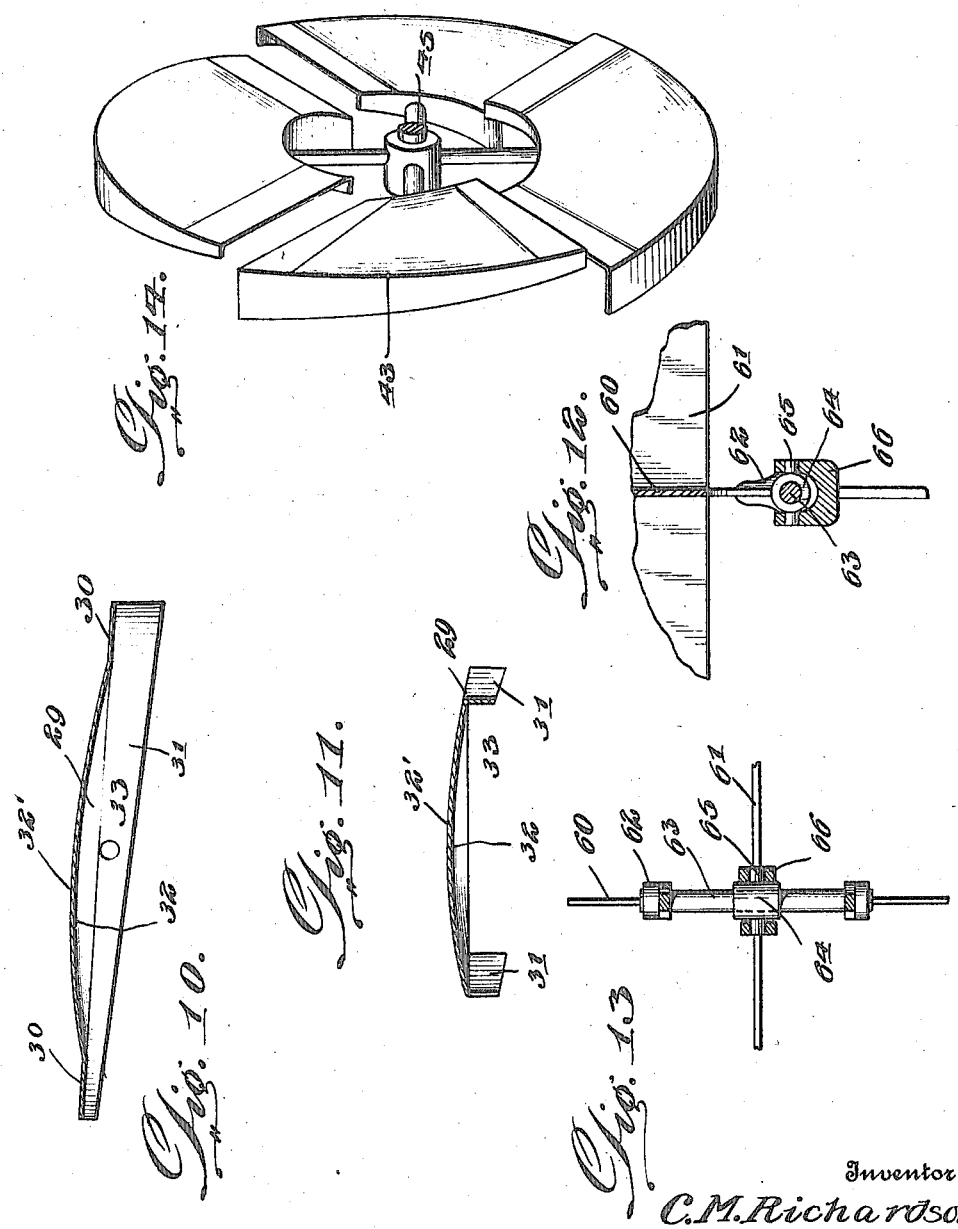

UNITED STATES PATENT OFFICE.

CHARLES M. RICHARDSON, OF BANTAM, CONNECTICUT.

FLYING-MACHINE.

1,184,571. Specification of Letters Patent. Patented May 23, 1916.

Application filed July 30, 1915. Serial No. 42,788.

*To all whom it may concern:*

Be it known that I, CHARLES M. RICHARDSON, a citizen of the United States, residing at Bantam, in the county of Litchfield and State of Connecticut, have invented new and useful Improvements in Flying-Machines, of which the following is a specification.

This invention relates to flying machines of the combined aeroplane and helicopter type, and particularly to a machine of novel construction which I term a "Spiroplane," contemplating the provision of a machine having a low center of gravity to secure inherent stability and a novel organization of lifting, propelling, breaking and reversing, steering and safety devices, whereby a flying machine of maximum stability and flying and lifting efficiency is produced.

One object of the invention is to provide a machine of the character described embodying a novel construction of lifting propeller, having blades which operate to confine and compress the air to a maximum degree for a working thrust action, and which are adjustable to a working angle of incidence for a lifting action and to a neutral angle to serve as an aeroplane or retarder in controlling the speed of descent of the machine.

Another object of the invention is to provide a lifting propeller which may be controlled to adapt the machine to make ascents and descents, to hover in the air over any given point, to ascend or descend with greater or less speed, and to make a gliding descent when desired.

A further object of the invention is to provide a novel construction and arrangement of driving and breaking or reversing propellers, whereby the machine may be driven ahead and quickly stopped for a quick descent or steering action, or reversed or driven backward when occasion requires, together with means for controlling the propellers for these various purposes.

A still further object of the invention is to provide a flying machine having a safety parachute which may be thrown into and out of action at will, and steering means by which the machine may be caused to ascend or descend at a desired angle and to be turned to the right or left in a convenient and sensitive manner.

The invention consists of the features of construction, combination and arrangement of parts herein fully described and claimed, reference being had to the accompanying drawings in which:—

Figure 1 is a side elevation of a flying machine embodying my invention, showing the lifting and driving propellers as arranged for working action. Fig. 2 is a top plan view of the same. Fig. 3 is a vertical longitudinal section on an enlarged scale through the central driving shaft and the gearing operated thereby, and showing in full and dotted lines the different positions of the control levers and the parts affected thereby within the boundary of the illustration. Fig. 4 is a similar view through the upper portion of the drive shaft, the parachute and the connections between the drive shaft and the blades of the lifting propeller. Fig. 5 is a vertical transverse section on the line 5—5 of Fig. 3. Fig. 6 is a horizontal transverse section on the line 6—6 of Fig. 4. Fig. 7 is a horizontal transverse section on the line 7—7 of Fig. 4. Fig. 8 is a horizontal transverse section on the line 8—8 of Fig. 1. Fig. 9 is a perspective view of one of the lifting propeller blades. Figs. 10 and 11 are longitudinal and transverse sections of the same. Fig. 12 is a section on the line 12—12 of Fig. 1. Fig. 13 is a section on the line 13—13 of Fig. 1. Fig. 14 is a perspective view of one of the driving propellers.

In carrying my invention into practice, I provide a main frame 1 having head and tail extensions or outriggers 2 and 3, and including depending legs 4 provided with suitable wheels or rollers 5 for supporting the machine when at rest upon the ground. It will, of course, be understood that the machine may be provided with any suitable type or style of launching and alighting mechanism, adapting it to make direct or gliding ascents and descents, and to be launched from and to alight upon the surface of a body of water, whenever desired. In practice, the parts of the framework are preferably made of strong metallic tubing and sheet material, but any suitable material may be employed. The main frame is provided with any suitable number of decks or platforms, a lower deck or platform 6 being provided in the present instance to support the motive power plant and an upper platform or deck 7 to carry the pilot and passengers.

Bearings 8 of the anti-friction ball or roller type are provided upon the main frame for a central, hollow vertical shaft 9 which is mounted for free rotation in said bearings, while held from longitudinal movement. This shaft carries a main driving gear 10 which meshes with and receives motion from drive pinions 11 on power shafts 12 driven from motors 13, which may be of any preferred type and requisite power, and the driving action of which may be governed, either directly through the fuel supply or indirectly through transmission gearing, to regulate the speed of motion of the shaft 9 as desired or as occasion may require.

The construction of the machine as a whole, as well as the arrangement of the parts is such, that the major portion of the weight of the machine and its load is placed at a low point upon the main frame, whereby the machine itself is adapted to normally maintain a substantially plumb position by gravity, thus preventing it from at any time being overturned in the air.

The shaft 9 extends to a suitable elevation above the main frame and preferably carries at its upper end a folding parachute 14, of the umbrella type, including spreaders or braces 15 and a sliding sleeve or runner 16 whereby the parachute may be collapsed, as shown in full lines, or preliminarily opened for a spreading action, under air or pressure, as shown in dotted lines. The sleeve or runner 16 is coupled by a cross bar 17 movable in guide slots 18 in the shaft 9 with the upper end of a connecting rod 20 disposed within the hollow shaft and connected at its lower end with a cross bar 21 movable in guide slots 22 in the shaft and connected with a sliding collar 23 on the outside of the shaft, whereby the rod may be held in a depressed condition to hold the parachute against opening movement and elevated and released to partially open the parachute and adapt it to be spread open by the pressure of the air to a supporting position. The parachute is employed in the event that, from any cause, the machine gets beyond the control of the operator and is about to fall, and provides a safety appliance whereby under such condition the speed of descent of the machine will be arrested and a safe descent to the ground insured. A control lever 24 is pivotally mounted upon the machine and provided with a forked portion carrying friction rollers 25 to engage a groove 26 in the sleeve 23, whereby said sleeve may be elevated to raise the rod 20 for the preliminary parachute opening and releasing actions referred to, the lever and sleeve also serving as a means by which a closing or collapsing action of the parachute may be affected after it has been spread for action.

Secured to the shaft 9 at a point between the main frame and the parachute is a propeller supporting frame 27 carrying a lifting and sustaining propeller consisting of an annular series of blades 28. These blades coöperate to form segments of an annular propeller which encircles the shaft. Each of these segmental propeller blades or sections consists of a longitudinal and transversely curved body or blade proper 29 merging at its leading and trail portions into plane or flat surfaces 30 and provided with depending side walls 31. The body 29 of the blade has a lower concaved reaction surface 32 and an upper convex rarefaction surface 32', the underside of the body forming a compression chamber 33. This chamber 33 constitutes the top portion of a trough-shaped air passage formed by the body and the depending side walls 32, said trough-shape channel being adapted to gather and confine the air, which is held from lateral escape during compression against the reaction surface of the blade by the side walls 31, so that the air will be compressed to a maximum degree and retained during its reaction or lifting impulse, whereby all of the available lifting force resulting from the expansion and reaction of the air is utilized.

The blades of the lifting propeller are disposed for a working action at an upward and forward angle of incidence to a determined degree, and as each blade revolves and gathers the air, the gathered air is compressed by the surface 32 within the chamber 29 and trough-shape passage and is deflected downwardly for reaction, the walls 31 being preferably longitudinally tapered so as to gradually increase in depth rearwardly, whereby the lifting body of compressed air will be confined to a large extent until it reaches the rear end of the trough-shape channel, through which it finally discharges, by means of which the supporting efficiency of the propeller is materially increased. The propeller blades are inclined as a whole to give the same lifting effect as a spiral or worm, while obtaining a plurality of lifting actions simultaneously, by which the machine and its load may be lifted and supported at a comparatively low speed of the propeller.

The propeller blades are fixed to the outer ends of shafts 34 journaled to rock in bearings 35 on the frame 27 and at their inner ends the shafts are provided with crank arms 36, the cranks of the several shafts being coupled to the upper end of a controlling rod 37 vertically movable within the hollow shaft 9, slots 38 being provided in said shaft to permit the coupling connections between the rod and shaft to have vertical movement. By adjusting the rod 37 vertically in one direction the shafts may be rocked in one direction to tilt the blades to a desired working angle of incidence, which may vary from maximum to minimum to vary the lifting action of the propeller, while by moving the rod in the opposite direction the shafts will be rocked in the reverse direction to tilt or adjust the propeller blades horizontally or back into a common plane in which the surfaces 30 of the journal blades are in line with each other. When the blades are so disposed the propeller is adapted to perform the function of a fixed or rotating sustaining plane as desired, which may be employed in gliding actions or as a retarder or supplementary parachute for coöperation with the parachute 14 when it is necessary to arrest the descent of the machine in case of danger. The rod 37 is connected at its lower end with a sleeve 39' grooved to receive friction rollers 40 on the forked end of a pivoted lever 41 adjustable by means of a screw 42 to move the rod upwardly and downwardly, as will be readily understood.

Arranged at the forward end of the frame are right and left driving propellers 43 and 43' and an intermediate braking or reversing propeller 44, each of said propellers comprising a series of blades, similar to the blades of the lifting propeller, but mounted at a proper working angle upon a horizontal shaft, the propellers 43 and 43' being mounted upon the forward ends of forwardly diverging shafts 45 and 45' disposed on opposite sides of the longitudinal center of the machine, while the propeller 44 is mounted upon a shaft 46 arranged on a line coincident with the longitudinal center of the machine. The blades of the propellers 43 and 43' are arranged at such angles as to give a backward and lateral thrust, the lateral thrust being of a minimum degree, and the inclination of the blades of the respective propellers also such that each propeller tends to counteract the lateral thrust of the other, thus preventing or diminishing any tendency of the machine to be deflected laterally from its intended path of travel. The blades of the propeller 44, which are preferably arranged on a line equidistant between and in advance of the propellers 43 and 43', are reversed as to position with regard to the position of the blades of the propellers 43 and 43', and hence when the propeller 46 is set into action it exerts a backward pressure or thrust against the forward movement of the machine, whereby said propeller 34 is adapted to be employed as a brake to bring the machine to a quick stop or to back it or drive it rearwardly under different conditions of service, whereby the complete control over the machine is obtained.

The propeller shafts 45, 45' and 46 are journaled at their forward ends in pivoted bearings 47 in a curved bearing bracket 48 carried by the head frame and at their rear ends the said shafts are journaled in bearings 49 mounted for vertical movement in a guide frame or bracket 50 and provided with guide pins or studs 51 engaging guide slots 52 in said frame, the shaft 45 and 45' being respectively provided at their inner ends with beveled pinions or friction wheels 45ª and 45ᵇ while the shaft 46 is provided at its inner end with a similar gear or friction wheel 46ª. The gears 45ª and 45ᵇ are adapted to engage the beveled undersurface 53 of a double beveled drive gear or friction disk 54 fixed to the shaft 9, the upper beveled face 55 of which disk is adapted for engagement with the gear or disk 46ª, the construction and relative arrangement of the bearings 49 being such as to hold the gears so spaced that when the bearings are at the limit of their upward movement the gears 45ª and 45ᵇ will engage the gear 54 while the gear 46ª will be out of engagement with said gear 54, and so that when the bearings are lowered to the fullest degree the gear 46ª will engage the gear 54 while the gears 45ª and 45ᵇ will be out of engagement with the gear 54, it being thus evident that the driving and reversing propellers may be alternately thrown into and out of action, the reversing propeller being inactive when the driving propellers are in operation, and vice versa. The gears have also an intermediate position in which all of them are out of engagement with the gear 54, so that both the driving and the reversing propeller may be thrown out of action. The bearings 49 are adjustable in the guide 50 by means of an arm 55 engaging one arm 56 of a pivoted lever 57, the other arm 58 of which is connected with an adjusting screw 59, whereby the lever may be operated to raise and lower the bearings and the shafts journaled therein and to lock the same in adjusted position. By the use of driving and reversing propellers of the construction described a better working action is obtained than is possible with propellers of ordinary construction, since the compressed air is confined and a greater thrust action obtained, while the walls or flanges 31 of the propeller also tend to prevent slippage.

For the purpose of vertically and horizontally steering the machine I preferably provide a compound or combined vertical and horizontal rudder, comprising a vertical plane 60 and a horizontal plane 61, fixed with relation to each other, and connected by means of eyes 62 to the upper and lower ends of a rod or shaft 63 extending through a bearing block 64 provided with trunnions 65 journaled in bearings 66 on the tail frame 3, the described construction providing a universal joint which admits of the propeller being swung vertically or laterally to steer the machine up or down or sidewise in either direction. The arms of a steering fork 67 are connected with the upper and lower ends of the shaft 63 and said fork is movable through the medium of a lever or other suitable control device 68 whereby the rudder may be adjusted in an obvious manner. While the propelling device of the machine may be employed for steering actions, and will be so employed under some conditions, a rudder of the character described or its equivalent is preferably used for greater convenience in steering and controlling the machine and for giving complete control in the event of derangement of the propelling mechanism. In practice, the driving and reversing propellers may be arranged either at the bow or stern end of the machine, and the same is true with respect to the compound rudder, it being understood, however, that it is preferable to dispose the propellers and rudder at opposite ends of the frame, the right being reserved of disposing the parts as may be found most desirable or serviceable in practice.

In the operation of the machine, it will be understood that the parachute remains at all times in a collapsed condition until its use is absolutely required, and that in launching the machine the motors are set into action to drive the shaft 9 and the blades of the lifting propeller are adjusted to a maximum angle of incidence to give a maximum lifting effect. This propeller is kept in operation until the machine is raised directly or at a desired climbing angle to the desired height, at which time the driving propellers are set into action to drive the machine ahead on its intended course, while the blades of the lifting propeller are either adjusted to a neutral angle to form an aeroplane surface or to less than a maximum angle of incidence so that the propeller will operate simply to give the required amount of sustaining action to support the machine in the air. The machine may be launched and landed like an ordinary gliding type of machine, or it may be landed directly in a vertical path by throwing the driving propellers out of action and reducing their speed and controlling the speed of the lifting propeller to allow the machine to descend slowly to the ground. Whenever desired the driving propellers may be thrown out of action and the reversing propeller thrown into action to decrease the speed of the machine or bring it to a quick stop or to cause it to move backwardly in maneuvering, etc., thus giving the pilot complete control over the machine under all conditions of service. If, through derangement of the propellers or motor, the machine should begin to fall the parachute may be thrown into action and will coöperate with the lifting propeller to support the machine sufficiently as it falls to bring it slowly and in an erect position to the ground.

I claim:—

1. A flying machine including a frame structure, a vertical shaft, a lifting propeller carried by said shaft, a gear upon said shaft, horizontally extending propeller shafts arranged above and below the horizontal plane of said gear, propellers upon said shafts, gears upon said shafts, and means for tilting the propeller shafts to throw the gears thereon into and out of engagement with the gear upon the vertical shaft.

2. A flying machine including a frame structure, a vertical shaft, a lifting propeller carried by said shaft, a gear upon said shaft, horizontally extending propeller shafts arranged in horizontal planes above and below the plane of said gear, gears upon said horizontal propeller shafts, and means for simultaneously tilting the propeller shafts in unison in one direction or the other, to throw the gear upon one of said shafts into engagement with and the gear upon the other of said shafts out of engagement with the gear upon the vertical shaft, or vice versa.

3. A flying machine including a frame structure, a vertical shaft, a lifting propeller carried by said shaft, front and rear sets of brackets upon the frame structure, bearing sleeves pivotally engaging the front bracket and slidably and pivotally engaging the rear bracket, horizontal propeller shafts journaled in said sleeves and disposed at different elevations, a gear upon the vertical shaft, gears upon the horizontal propeller shafts arranged above and below said gear upon the vertical shaft, and means for tilting said horizontal shafts in a vertical plane, substantially as and for the purpose described.

4. A flying machine including a frame structure, a vertical shaft, a lifting propeller carried by said shaft, a gear upon the shaft, longitudinally extending forwardly diverging propeller shafts journaled on the frame, driving propellers carried by said shafts, gears upon the rear ends of said shafts, and means for tilting the shafts to throw the gears thereon into and out of engagement with the gear on the vertical shaft.

5. A flying machine including a frame structure, a vertical shaft on the frame structure, a lifting propeller carried by said shaft, means for driving said propeller, a pair of longitudinally extending forwardly divergent propeller shafts, a longitudinally extending third propeller shaft, arranged above and on a line between the first-named propeller shafts, driving propellers upon the ends of the first-named propeller shafts, a braking and reversing propeller upon the forward end of the last-named shaft, bearings in which the rear ends of said propeller shafts are mounted, a double beveled gear upon the vertical shaft, gears upon the driving propeller shafts adapted to be moved into and out of engagement with the lower beveled surface of the double gear, a gear upon the rear end of the braking propeller shaft adapted to be moved into and out of engagement with the upper beveled face of the double gear, and means for adjusting the three shafts simultaneously to throw the gears of the driving propeller shafts into and the gear of the braking propeller shaft out of engagement with the double beveled gear on the drive shaft, and vice versa.

In testimony whereof I affix my signature in presence of two witnesses.

CHARLES M. RICHARDSON.

Witnesses:
JOHN T. HUBBARD,
JULIA F. MORSE.